(12) United States Patent
Wu

(10) Patent No.: US 8,594,671 B2
(45) Date of Patent: Nov. 26, 2013

(54) METHOD OF HANDLING MINIMIZATION OF DRIVE TESTS IN RADIO ACCESS TECHNOLOGY CHANGE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 0 days.

(21) Appl. No.: 13/280,305

(22) Filed: Oct. 24, 2011

(65) Prior Publication Data

US 2012/0108241 A1 May 3, 2012

Related U.S. Application Data

(60) Provisional application No. 61/409,125, filed on Nov. 2, 2010.

(51) Int. Cl.
*H04W 36/00* (2009.01)
(52) U.S. Cl.
USPC ........... 455/436; 455/437; 455/438; 455/439; 455/442; 455/443; 455/444; 370/331
(58) Field of Classification Search
USPC ......... 455/436, 437, 438, 439, 442, 443, 444; 370/331
See application file for complete search history.

(56) References Cited

U.S. PATENT DOCUMENTS

2008/0287133 A1* 11/2008 Park et al. ............... 455/442
2009/0005044 A1* 1/2009 Payyappilly et al. ......... 455/436
2010/0190499 A1* 7/2010 Wu ............................ 455/436
2012/0015657 A1* 1/2012 Comsa et al. .............. 455/436
2012/0064886 A1* 3/2012 Kim et al. .................. 455/423
2012/0106356 A1* 5/2012 Johansson et al. ......... 370/241.1

FOREIGN PATENT DOCUMENTS

WO 2010087625 8/2010

OTHER PUBLICATIONS

European patent application No. 11008604.8, European Search Report mailing date: May 2, 2012.
3GPP TS 37.320 V1.0.0 (Aug. 2010), "3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests(MDT); Overall description; Stage 2 (Release 10)", XP050442198, pp. 1-15.
Kyocera, "Inter-RAT MDT data retrieval and MDT (re)-configuration", 3GPP TSG-RAN WG2 #71, R2-104813, Aug. 23-27, 2010, Madrid, Spain, XP050451954, pp. 1-5.
Qualcomm CDMA Technologies, "Requirements for Management of UE based Performance Measurements for MDT", 3GPP TSG-SA5 (Telecom Management) Meeting SA5#71, S5-101379, May 10-14, 2010, Montreal, Canada, XP050440486, pp. 1-2.
HTC, "Clarification on timer T326", 3GPP TSG-RAN2 Meeting #72, R2-106217, Oct. 15-19, 2010, Jacksonville, USA, XP050467054, pp. 1-2.

(Continued)

Primary Examiner — Khalid Shaheed
(74) Attorney, Agent, or Firm — Winston Hsu; Scott Margo

(57) ABSTRACT

A method of handling minimization of drive tests, hereafter called MDT, for a mobile device is disclosed. The method comprises receiving a MDT measurement configuration from a first RAT, starting a timer for a MDT measurement logging corresponding to a timer value in the MDT measurement configuration, and keeping the timer running when the mobile device performs an inter-RAT procedure to move from the first RAT to a second RAT.

7 Claims, 3 Drawing Sheets

(56) References Cited

OTHER PUBLICATIONS

3GPP TS 37.320 V1.1.0 3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10), Oct. 2010.

3GPP TSG-RAN WG2 Meeting #7bis R2-105880 "Introduction of Minimization of Drive Tests", Oct. 11, 2010.

3GPP TSG-RAN WG2 Meeting #71bis R2-105879 "Introduction of Minimization of Drive Tests", Aug. 11, 2010.

3GPP TS 25.331 V10.1.0 3rd Generation Partnership Project; Technical Specification Group Radio Access Network; Radio Resource Control (RRC); Protocol specification (Release 10), Sep. 2010.

3GPP TS 36.304 V9.4.0 3rd Generation Partnership Project; Technical Specification Group Radio Access Network; Evolved Universal Terrestrial Radio Access (E-UTRA); User Equipment (UE) procedures in idle mode (Release 9), Sep. 2010.

3GPP TS 25.304 V9.3.0 3rd Generation Partnership Project; Technical Specification Group Radio Access Network; User Equipment (UE) procedures in idle mode and procedures for cell reselection in connected mode (Release 9), Sep. 2010.

Introduction of Minimization of Drive Tests, 3GPP TSG-RAN WG2 Meeting #72 R2-106792, Nov. 15-19, 2010, Jacksonville, U.S.A.

Office action mailed on Oct. 9, 2012 for the Japanese application No. 2011-238523, filed Oct. 31, 2011, pp. 1-3.

LG Electronics Inc., "MDT timer handling details", 3GPP TSG-RAN2 Meeting #71, R2-104838, Aug. 23-27, 2010, Madrid, Spain.

Office Action mailed on Apr. 15, 2013 for the Korean Application No. 10-2011-0113185, filing date Nov. 2, 2011, pp. 1-4.

* cited by examiner

METHOD OF HANDLING MINIMIZATION OF DRIVE TESTS IN RADIO ACCESS TECHNOLOGY CHANGE

CROSS REFERENCE TO RELATED APPLICATIONS

This application claims the benefit of U.S. Provisional Application No. 61/409,125, field on Nov. 2, 2010 and entitled "Method and Apparatus for handling MDT logging in RAT change in a wireless communication system", the contents of which are incorporated herein in their entirety.

BACKGROUND OF THE INVENTION

1. Field of the Invention

A method utilized in a wireless communication and related communication device are disclosed, and more particularly, to a method of handling minimization of drive tests in radio access technology change in a wireless communication system and related communication device.

2. Description of the Prior Art

Coverage is something that a customer can easily notice through the terminal user interface (UI) (i.e. out-of-service area indication), and is a major criteria that a customer considers when comparing service provided by different operators. With the increase in data service provision, downlink throughput is also an important criterion by which many customers judge the performance of the network. Poor uplink coverage will impact user experience in terms of call setup failure/call drop/poor uplink voice quality.

Accordingly, it is very important for operators to be aware of the coverage/throughput their networks provide, and rigorous "drive tests" are performed to collect such information. However, what has to be taken account of is that the drive tests for network optimization purposes are costly and cause also additional $CO_2$ emissions, so it is desirable to develop automated solutions, including involving UEs in the field, in 3GPP to reduce the operator costs for network deployment and operation. Therefore, minimization of drive tests (MDT) functionality involving measurement is performed or logged by UE to collect information (or called measurement logs) in idle mode or connected mode, to reduce network maintenance costs for operators, ensure faster optimization cycle resulting in higher customer satisfaction and nonetheless help to reduce the carbon emission to protect the environment.

Note that, when a UE with MDT functionality receives a MDT measurement configuration message from a network (e.g. Universal Terrestrial Radio Access Network (UTRAN) in Universal Mobile Telecommunications System (UMTS), or Evolved Universal Terrestrial Radio Access Network (E-UTRAN) in Long-Term Evolution (LTE)), the UE shall perform measurement logging for the purpose of MDT and simultaneously start a timer for MDT measurement logging according to the MDT measurement configuration. In addition, the UE stops the MDT measurement logging only when the timer expires.

On the other hand, inter-radio access technology (inter-RAT) mobility involves transfer of a connection or mobility between a UE and a network from one RAT to another RAT. Inter-RAT procedure may occur due to handover, redirection, cell change order, cell selection or cell reselection. In the case of the cell reselection, the UE reselects a cell between cells using different RATs, such as GSM (Global System for Mobile communications)/GPRS (Global Packet Radio Service), UMTS and LTE.

However, the applicant notices that a UE may encounter problems associated to MDT measurement logging in RAT change as below based on a direct image on a basis of the prior art UMTS or LTE system.

In the first scenario, based on the 3GPP specification R2-105880, when a UE in UMTS system receives the MDT LOGGING CONFIGURATION message from the UTRAN, the UE performs MDT measurement logging in an idle mode, CELL_PCH or URA_PCH state and simultaneously starts the timer T326 for the MDT measurement logging. On the other hand, according to the 3GPP specification TS 25.331, when the UE performs inter-RAT procedure (e.g. inter-RAT cell selection/reselection from a UTRAN, inter-RAT handover from UTRAN or inter-RAT cell change order from UTRAN), and has successive in reselecting a cell in the target RAT (e.g. Global System for Mobile Communications (GSM)/GPRS or Evolved Universal Terrestrial Radio Access Network (E-UTRAN)), the UE releases all UTRAN specific resources. Therefore, the UE stops the timer T326 since this timer is associated to UTRAN specific resource. This results in that the UE keeps MDT measurement configuration and thereby logging endlessly. The UE power and storage are drained due to endless logging.

In the second scenario, based on the 3GPP specification R2-105879, when a UE in LTE system receives the IdleLoggingConfiguration message from E-UTRAN, the UE performs MDT measurement logging in radio resource control (RRC) idle mode and simultaneously starts timer T330 for MDT measurement logging. In addition, when the UE performs inter-RAT procedure from E-UTRAN to UTRAN, GERAN or CDMA 2000, the UE releases all EUTRAN specific resources according to the prior art. Therefore, the UE stops the timer T330 since this timer is associated to E-UTRAN specific resource. This results in that the UE keeps MDT measurement configuration and thereby logging endlessly. The UE power and storage are drained due to endless logging.

SUMMARY OF THE INVENTION

The application discloses a method of handling minimization of drive tests in radio access technology change in a wireless communication system in order to solve the above-mentioned problem.

A method of handling minimization of drive tests, hereafter called MDT, for a mobile device is disclosed. The method comprises receiving a MDT measurement configuration from a first RAT, starting a timer for a MDT measurement logging corresponding to a timer value in the MDT measurement configuration, and keeping the timer running when the mobile device performs an inter-RAT procedure to move from the first RAT to a second RAT.

A method of handling minimization of drive tests, hereafter called MDT, for a mobile device is disclosed. The method comprises receiving a MDT measurement configuration from a first radio access technology, starting a timer for a MDT measurement logging corresponding to a timer value in the MDT measurement configuration, and starting/restarting the timer when the mobile device performs an inter-RAT procedure to move from the first RAT to a second RAT.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
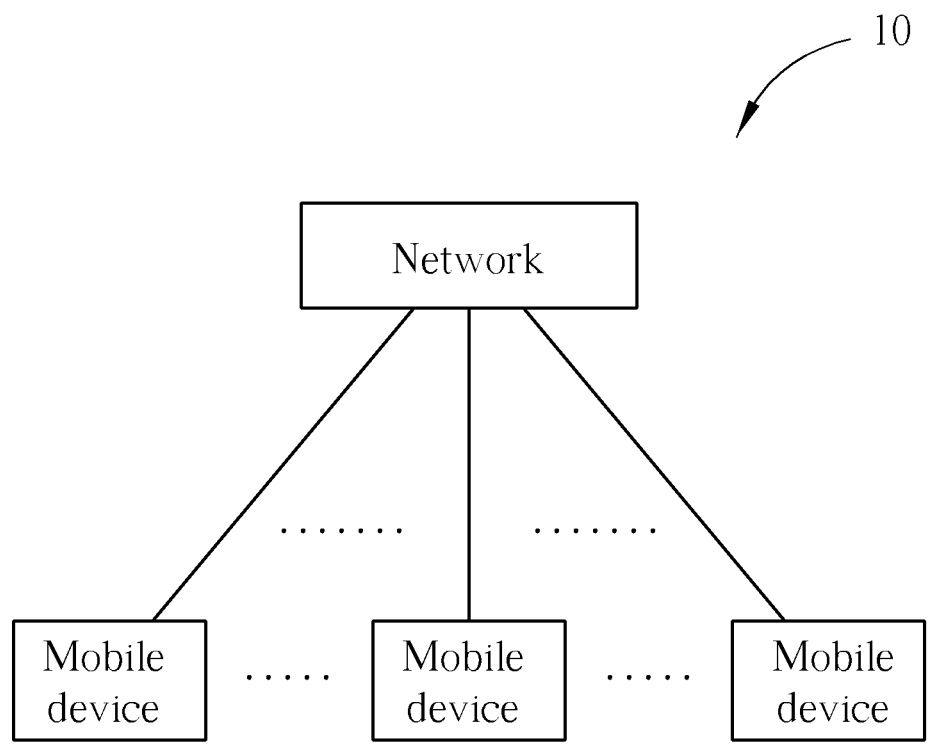
FIG. 1 illustrates a schematic diagram of an exemplary wireless communication system.

Please refer to FIG. 1, which illustrates a schematic diagram of a wireless communication system 10 according to an example. Briefly, the wireless communication system 10 is composed of a network and a plurality of mobile devices. The wireless communication system 10 can be a UMTS (Universal Mobile Telecommunications System), an LTE (long-term evolution) system or any other similar network system. In the UMTS system, the network can be referred as a UTRAN (Universal Terrestrial Radio Access Network) comprising a plurality of base stations (NodeBs), whereas the mobile devices are referred as to user equipments (UEs). The UEs can be devices such as mobile phones, computer systems, etc. This terminology will be used throughout the application for ease of reference. However, this should not be construed as limiting the disclosure to any one particular type of network. In some examples, the network and the UE may be seen as a transmitter or receiver according to transmission direction, e.g., for uplink (UL), the UE is the transmitter and the network is the receiver, and for downlink (DL), the network is the transmitter and the UE is the receiver.

Figure 2:
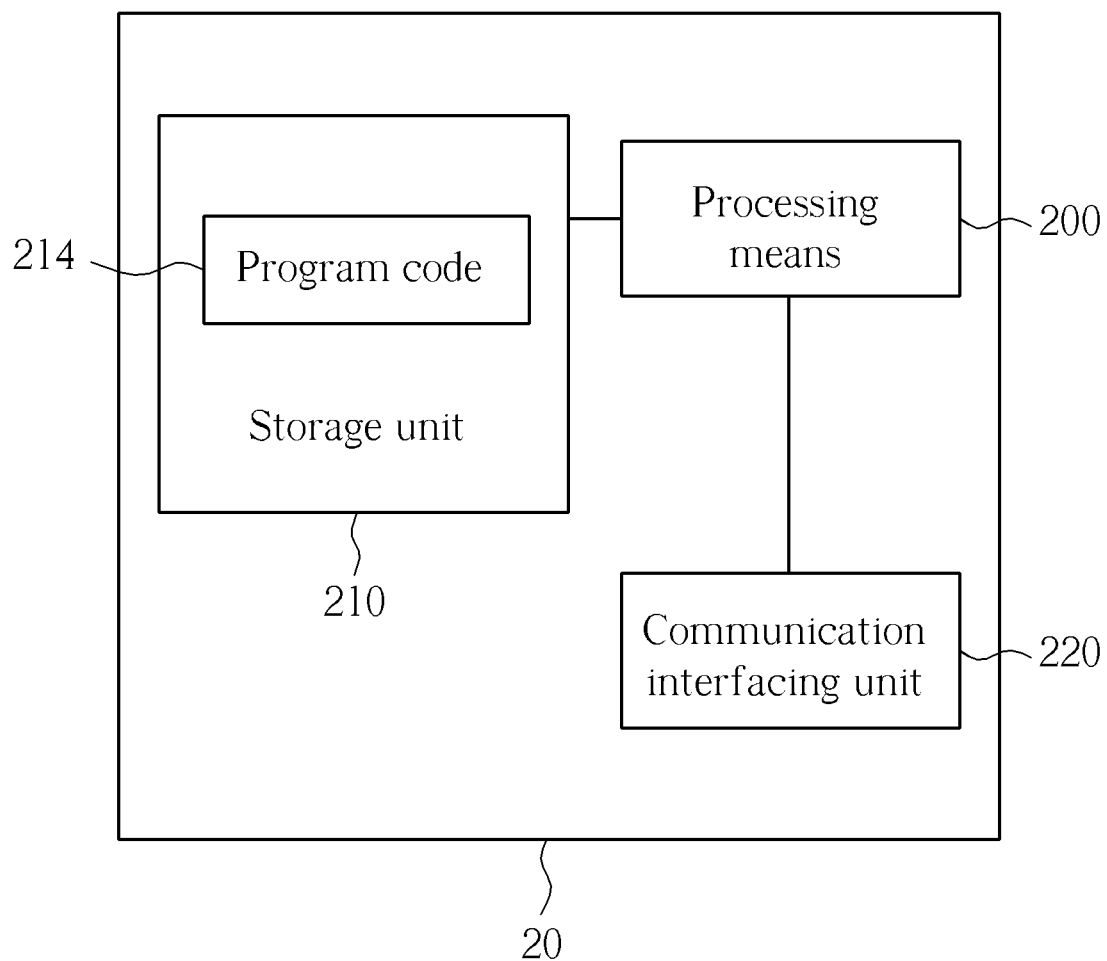
FIG. 2 illustrates a schematic diagram of an exemplary communication device.

FIG. 2 illustrates a schematic diagram of an exemplary communication device 20. The communication device 20 can be the mobile device 10 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
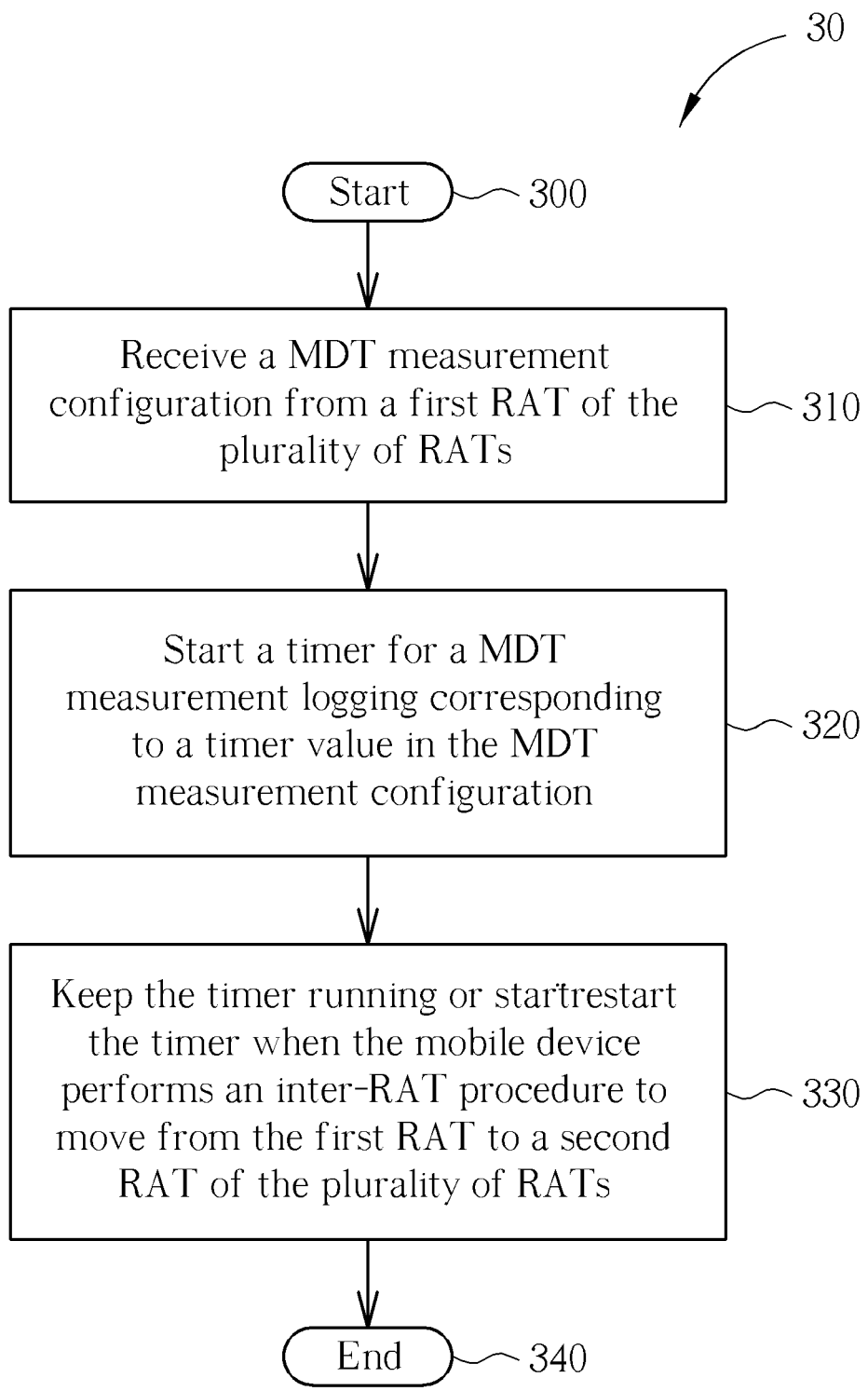
FIG. 3 is a flowchart of an exemplary process according to the present disclosure.

Please refer to FIG. 3, which illustrates a flowchart of an exemplary process 30. The process 30 is utilized in a UE with MDT functionality, where the UE is compatible with a plurality of radio access technologies (RATs) and can be the communication device 20 of FIG. 2. The process 30 may be compiled into the program code 214 and includes the following steps:

Step 300: Start.

Step 310: Receive a MDT measurement configuration from a first RAT of the plurality of RATs.

Step 320: Start a timer for a MDT measurement logging corresponding to a timer value in the MDT measurement configuration.

Step 330: Keep the timer running or start/restart the timer when the mobile device performs an inter-RAT procedure to move from the first RAT to a second RAT of the plurality of RATs.

Step 340: End.

According to the process 30, when the UE in a radio resource control (RRC) connected mode receives the MDT measurement configuration containing a timer value for logging duration timer, the UE starts the logging duration timer with the timer value. Note that the UE performs the MDT measurement logging when the logging duration timer is running, whereas stops performing the MDT measurement logging when the logging duration timer expires. Moreover, when the UE moves from the first RAT (e.g. UTRAN) to the second RAT (e.g. E-UTRAN) due to inter-RAT procedure (e.g. inter-RAT handover, inter-RAT cell change order, inter-RAT cell selection or inter-RAT cell reselection) from the RRC connected mode or an idle mode, the UE does not stop the logging duration timer but keeps the logging duration timer running, or starts/restarts the logging duration timer after stopping it. Thus, endless logging is avoided in RAT change, so as to save the UE power.

For clearly understating the concept of the present invention, take an example based on the process 30. A UE in LTE system receives IdleLoggingConfiguration message including logging duration from E-UTRAN and starts timer T330 for MDT measurement logging. In this situation, if the UE moves from E-UTRAN to UTRAN, GERAN or CDMA 2000, the UE does not stop the timer T330, but keeps the timer T330 running. Therefore, the MDT measurement logging will be stopped when the timer expires, so as to avoid endlessly logging and wasting UE power and storage. Or, the UE can stop the timer T330 when moving from E-UTRAN to UTRAN, GERAN or CDMA 2000, and then starts the timer T330 again or restarts the timer T330 with the remaining timer value of the stopped timer T330. Thus, the UE can end the MDT measurement logging when the timer expires, avoiding UE power and storage drained.

Similarly, if a UE in UMTS system receives MDT LOGGING CONFIGURATION message including logging duration from UTRAN and starts timer T326 for MDT measurement logging. In this situation, if the UE moves from UTRAN to E-UTRAN, GERAN or CDMA 2000, the UE does not stop the timer T326, but keeps the timer T326 running. Therefore, the MDT measurement logging will be stopped when the timer expires, so as to avoid endlessly logging and wasting UE power and storage. Or, the UE can stop the timer T326 when moving from UTRAN to E-UTRAN, GERAN or CDMA 2000, and then starts the timer T326 again or restarts the timer T326 with the remaining timer value of the stopped timer T326. Thus, the UE can end the MDT measurement logging when the timer expires, avoiding UE power and storage drained.

Based on the process 30, endlessly MDT measurement logging due to RAT change is avoided since the logging duration timer (e.g. T330 or T326) is kept running or started/restarted by the UE.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the exemplary examples and means are provided for handling MDT measurement logging in RAT change. The UE keeps the logging duration timer running or start/restart the logging duration timer if the logging duration timer is stopped by the UE due to RAT change, and thereby the MDT measurement logging will be ended when the logging duration timer expires, so as to avoid that the UE power is drained due to endless logging.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power-saving method of handling a minimization of drive, hereafter called MDT, including a MDT timer for a mobile device when the mobile device finishes an inter-RAT procedure, the method comprising:
 receiving a MDT measurement configuration from a first radio access technology (RAT);
 starting the MDT a timer corresponding to a timer value included in the MDT measurement configuration when the mobile device receives the MDT measurement configuration; and
 keeping the MDT timer running when the mobile device finishes the inter-RAT procedure and moves from the first RAT to a second RAT;
 wherein the MDT measurement configuration comprises an IdleLoggingConfiguration message or a MDT LOGGING CONFIGURATION message, and the MDT timer is a timer T326 and the first RAT is a Universal Terrestrial Radio Access Network, hereafter called UTRAN, or the MDT timer is a timer T330 and the first RAT is an Evolved UTRAN, hereafter called EUTRAN.

2. The method of claim 1, wherein keeping the MDT timer running when the mobile device finishes the inter-RAT procedure and moves from the first RAT to the second RAT comprises:
 when the mobile device finishes the inter-RAT procedure and moves from the first RAT to the second RAT, not stopping the MDT timer.

3. The method of claim 1, further comprising:
 stopping the MDT measurement logging when the MDT timer expires.

4. A power-saving method of handling a minimization of drive tests, hereafter called MDT, including a MDT timer for a mobile device when the mobile device finishes an inter-RAT procedure, the method comprising:
 receiving a MDT measurement configuration from a first radio access technology (RAT);
 starting the MDT timer corresponding to a timer value included in the MDT measurement configuration when the mobile device receives the MDT measurement configuration; and starting/restarting the MDT timer when the mobile device an finishes the inter-RAT procedure and moves from the first RAT to a second RAT;
 wherein the MDT measurement configuration comprises an IdleLoggingConfiguration message or a MDT LOGGING CONFIGURATION message, and the MDT timer is a timer T326 and the first RAT is a Universal Terrestrial Radio Access Network, hereafter called UTRAN, or the MDT timer is a timer T330 and the first RAT is an Evolved UTRAN, hereafter called EUTRAN.

5. The method of claim 4, wherein starting/restarting the timer when the mobile device finishes the inter-RAT procedure and moves from the first RAT to the second RAT comprises:
 when the mobile device finishes the inter-RAT procedure, moves from the first RAT to the second RAT, and stops the MDT timer that has started, starting/restarting the MDT timer with a remaining timer value of the started MDT timer.

6. The method of claim 4, further comprising:
 stopping the MDT measurement logging when the MDT timer expires.

7. The method of claim 2, wherein the inter-RAT procedure comprises an inter-RAT cell reselection from UTRAN, an inter-RAT handover from UTRAN, or an inter-RAT cell change order from UTRAN.

* * * * *